United States Patent [19]

Chang et al.

[11] 4,128,772
[45] Dec. 5, 1978

[54] GENERATION OF TUNABLE FAR-INFRARED RADIATION

[75] Inventors: Tao-Yuan Chang, Lincroft; Theodoor C. Damen, Colts Neck; Van-Tran Nguyen, Holmdel, all of N.J.

[73] Assignee: Bell Telephone Laboratories, Incorporated, Murray Hill, N.J.

[21] Appl. No.: 865,434

[22] Filed: Dec. 29, 1977

[51] Int. Cl.² .............................................. H03F 7/00
[52] U.S. Cl. ...................................... 307/88.3; 330/4.5
[58] Field of Search ......................................... 307/88.3

[56] References Cited

U.S. PATENT DOCUMENTS

| | | | |
|---|---|---|---|
| 3,795,819 | 3/1974 | Harris | 307/88.3 |
| 3,816,754 | 6/1974 | Hodgson et al. | 307/88.3 |
| 3,892,979 | 7/1975 | Hodgson et al. | 307/88.3 |
| 3,914,618 | 10/1975 | Harris | 307/88.3 |

*Primary Examiner*—Darwin R. Hostetter
*Attorney, Agent, or Firm*—Daniel D. Dubosky

[57] ABSTRACT

A tunable far infrared generator makes use of a four-photon mixing process that cycles among highly excited atomic states, the lowest of which states is reached from the atomic ground state by a visible or ultraviolet photon, and the remainder of which states are connected by transitions in the infrared.

5 Claims, 5 Drawing Figures

GENERATION OF TUNABLE FAR-INFRARED RADIATION

BACKGROUND OF THE INVENTION

In the prior art of difference frequency mixing to produce infrared radiation, a four-photon process has been used to generate $\omega_4 = \omega_1 + \omega_2 - \omega_3$. (See, for example, U.S. Pat. No. 3,914,618, issued to Stephen E. Harris on Oct. 21, 1975). In that work the sum $\omega_1 + \omega_2$ was close to the frequency associated with a two-photon transition from an atomic ground state to an excited state. An example, taken from U.S. Pat. No. 3,914,618, is illustrated in FIG. 1, which shows the relevant energy levels of sodium. There, $\omega_1$ and $\omega_2$, corresponding to 6856 Å, and the two-photon-transition is from the ground state of a sodium atom (3s) to the 3d state. If a beam of ultraviolet radiation at 3321 Å is applied, output radiation at the difference frequency corresponding to a wavelength of 10.61 $\mu$ will be generated. In this and all other examples that have been found, the lower state of the two-photon transition, which is the lowest-energy state used in the mixing process, is the ground state of the conversion medium. This method of generating infrared radiation is energy-inefficient in the sense that two visible and one ultraviolet photon are required to produce every infrared photon.

SUMMARY OF THE INVENTION

The invention relates to an apparatus for generating tunable infrared radiation by means of a four-photon mixing process, in which the lowest state of the mixing process is an excited state of the conversion medium.

An atom of the conversion medium is excited from its ground state to the lowest state of the mixing process by a visible or ultraviolet photon, and the mixing process involves three infrared photons as inputs, thus producing output photons with the expenditure of less energy than in the prior art. If the lowest energy state involved decays slowly to other states or back to the ground state, then several iterations of the mixing process may take place before the atom shifts to another state, and several output photons may be generated for each photon that excites an atom to the lowest state of the mixing process.

DETAILED DESCRIPTION

Figure 3:
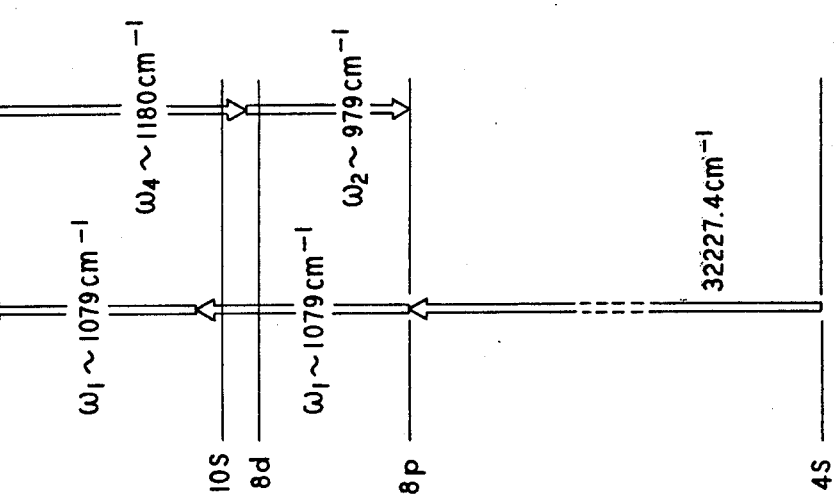
FIG. 3 shows an energy level diagram of potassium, illustrating energy levels relevant to the generation of 8.5 $\mu$m radiation.
Figure 1:
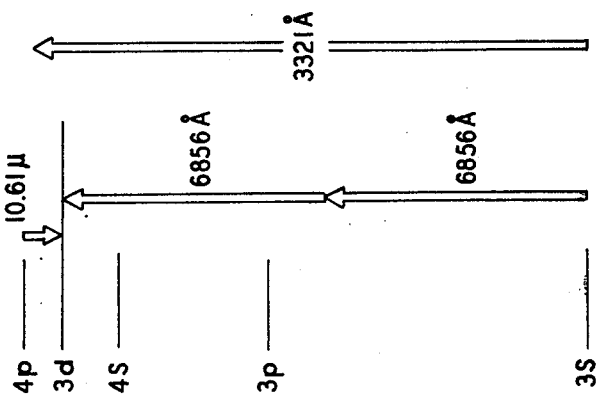
FIG. 1 shows an energy level diagram of sodium, illustrating states pertinent to the teaching of the prior art.
Figure 2:
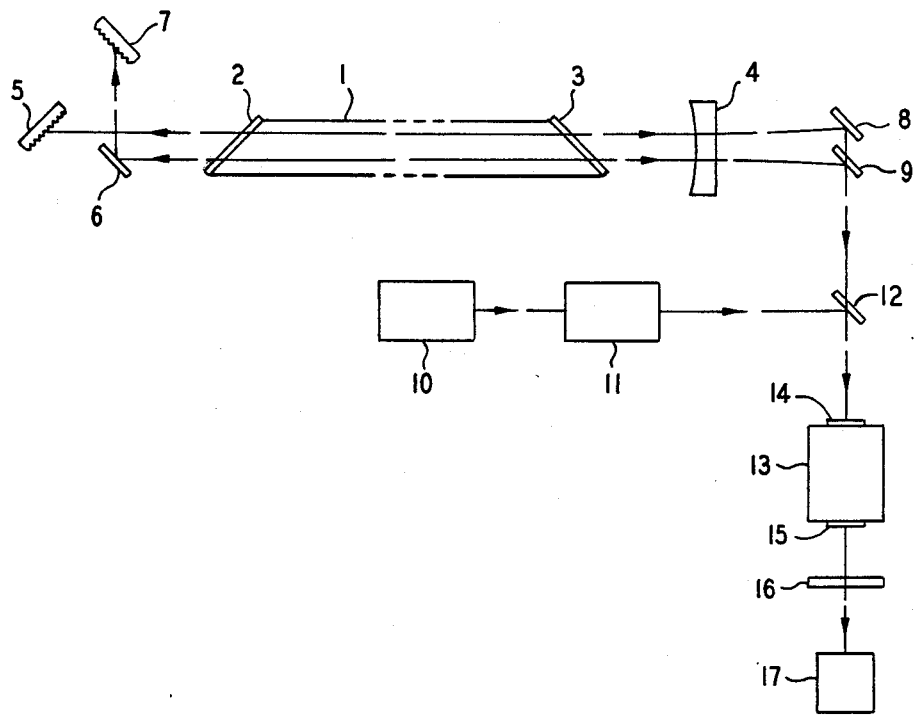
FIG. 2 shows in schematic form an apparatus constructed according to the invention for the generation of radiation at approximately 8.5 $\mu$m.

In FIG. 2, a schematic diagram of an apparatus is shown that uses the energy levels of potassium shown in FIG. 3 to generate radiation at 8.5 $\mu$m. The relation between the infrared photons may be written $\omega_4 = 2\omega_1 - \omega_2$ where $\omega_1$ has the wave number 1079 cm$^{-1}$ (wave number is equivalent to energy and 1 cm$^{-1}$ = 1.23 × 10$^{-4}$ electron volts), and $\omega_2$ = 979 cm$^{-1}$. It may be desired to use three input lasers for the reaction $\omega_4 = \omega_1 + \omega_2 - \omega_3$.

Both $\omega_1$ and $\omega_2$ are generated by means of the same discharge tube, for reasons of economy. Separate lasers could, of course, be used. Discharge tube 1 is a transversely excited $CO_2$ high pressure tube, well known to those skilled in the art.

Windows 2 and 3 of tube 1 are set at the Brewster angle to eliminate reflections and the radiation generated in tube 1 is tuned in two cavities. Radiation of frequency $\omega_1$ is tuned by grating 5, which is set to reflect the desired frequency back into tube 1. Mirror 4, the slightly curved output mirror, is common to both beams, reflecting a portion of the radiation back and transmitting another portion. Radiation for the second beam is deflected by mirror 6 into grating 7, which is set to reflect back radiation at frequency $\omega_2$.

The output radiation passing through mirror 4 is combined by mirror 8 and dichroic mirror 9, and directed toward vapor cell 13, which contains the conversion medium. The two beams $\omega_1$ and $\omega_2$ must overlap in cell 13, of course, in order to interact, but they need not be collinear. It may be desirable to provide phase matching by the use of non-collinear beams, according to a technique well-known to those skilled in the art. Vapor cell 13 includes a heating element for vaporizing the conversion medium. In the illustrative embodiment, the temperature used was about 350° C. and the pressure was about 1 Torr. The process is not expected to be affected strongly by variations in temperature. At higher pressures the coherence length for the process will be reduced and therefore phase matching will be somewhat more difficult.

The ultraviolet beam of wave number 32,277.4 cm$^{-1}$ is produced by taking a beam from dye laser 10 at 16,138.7 cm$^{-1}$ and frequency-doubling it in KDP crystal 11. The output beam from crystal 11 is directed by dichroic mirror 12 into vapor cell 13. This output beam must overlap spatially the intersection of the beams at frequencies $\omega_1$ and $\omega_2$ because the excited atoms produced by the ultraviolet beam must be at the same location as the infrared beams in order for the radiation-generating reaction to proceed. The ultraviolet beam need not be present at the same time as the infrared beams because the atoms will remain in the excited state for a while. It is sufficient that the ultraviolet beam come at a time before the infrared, such that a reasonable number of atoms remain in the excited state. Dichroic mirror 12 is formed from an infrared transmissive substrate, illustratively BaF$_2$, coated with a thin ultraviolet reflective dielectric film. The film absorbs in the infrared but is so thin (only a few microns) that only a neglible amount is lost.

Entrance window 14, illustratively of BaF$_2$, transmits both infrared and ultraviolet. Exit window 15 need only transmit the output infrared radiation. Filter 16, located behind exit window 15, permits only the output radiation to pass through to utilization apparatus 17 which, in the illustrative embodiment, is a radiation detector.

FIG. 3 illustrates those energy levels of potassium that are relevant to the practice of the invention. An ultraviolet photon of wave number 32,227.4 cm$^{-1}$ excites a potassium atom from its 4s ground state to the 8p state. The sum of the energy of two photons at 1079 cm$^{-1}$ is nearly equal to the 8p – 15p energy difference of 2160.7 cm$^{-1}$, providing resonance enhancement of the reaction. If the second energy of $\omega_2$ is 979 cm$^{-1}$, the output $\omega_4$ of the process $\omega_4 = 2\omega_1 - \omega_2$ will be approximately 1180 cm$^{-1}$. The process is further enhanced by the near resonance of the 979 cm$^{-1}$ beam with the energy of the transition from the 15p to the 10s state.

Figure 4:
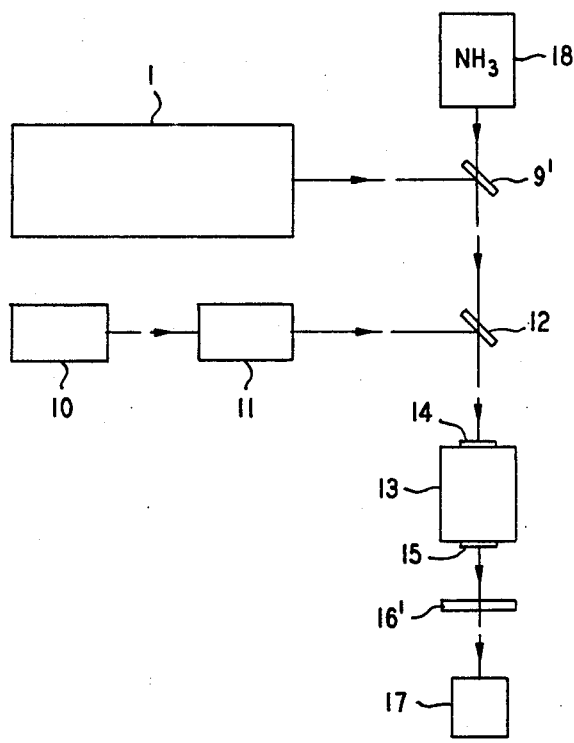
FIG. 4 shows in schematic form an apparatus constructed according to the invention for the generation of radiation at approximately 16 $\mu$m.

FIG. 4 shows a schematic diagram of an apparatus for the generation of 16 μm radiation, utilizing the energy levels of rubidium. CO$_2$ laser 1 generates a beam at 938 cm$^{-1}$ and NH$_3$ laser 18 generates a beam at 780 cm$^{-1}$, both lasers being synchronized by conventional means not shown. The two beams are combined by dichroic mirror 9'. An ultraviolet beam from laser 10 and KDP frequency doubling crystal 11 is combined with the infrared radiation by dichroic mirror 12, also as before. Vapor cell 13, windows 14 and 15, filter 16' and utilization apparatus 17 perform the same functions as their counter-parts in FIG. 2, except that vapor cell 13 contains a vapor of rubidium. Dichroic mirror 9' and filter 16' differ, of course, in their frequency behavior, since the radiation they manipulate is of different frequency.

Figure 5:
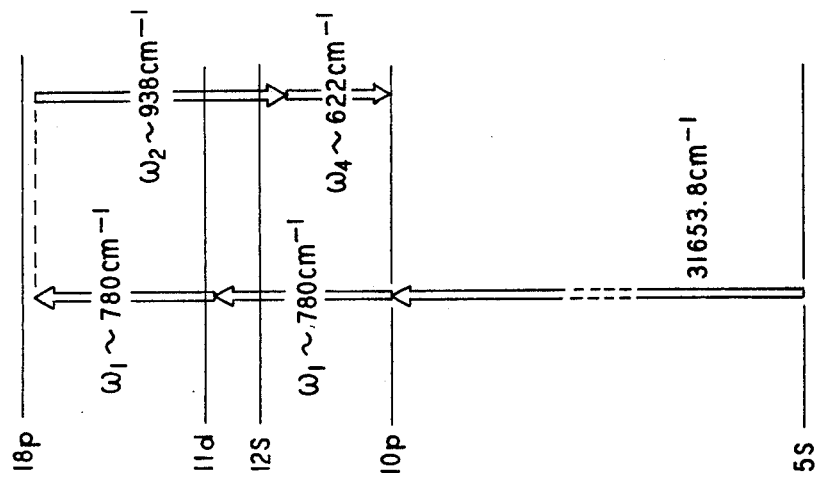
FIG. 5 shows an energy level diagram of rubidium, illustrating energy levels relevant to the generation of 16 $\mu$m radiation.

FIG. 5 illustrates the relevant energy levels of rubidium. An ultraviolet photon of 31653.8 cm$^{-1}$ excites an atom from the 5s ground state to the 10p state. Two photons at 780 cm$^{-1}$ from NH$_3$ laser 2 are nearly resonant with the 10p - 18p transition. A 10.6 μm photon at 938 cm$^{-1}$ from CO$_2$ laser 1 is nearly resonant with the 18p - 12s transition. The three input photons combine to generate $\omega_4 = 2\omega_1 - \omega_2$ at 622 cm$^{-1}$.

In addition to the high efficiency that results from the use of double resonance enhancement and from the large interaction probabilities of these highly excited states, the well-known limiting effects of saturation and multi-photon ionization that affected prior art devices are less severe because the population of the excited states may be controlled by controlling the power and frequency of the ultraviolet beam. Further, since all the frequencies $\omega_1$, $\omega_2$, $\omega_3$ and $\omega_4$ are in the infrared and quite close to each other, the phase-matching conditions in the mixing process will be easily satisfied.

We claim:

1. An apparatus for generating infrared radiation comprising:
   a conversion vessel having infrared transmitting entrance and exit windows for containing a conversion medium;
   said conversion medium including atoms having a ground state, a predetermined first excited state and a plurality of excited states higher in energy than said first excited state;
   means for exciting a portion of said atoms of said conversion medium from said ground state to said first excited state at a predetermined time;
   means for generating at least two beams of infrared photons of at least two predetermined energies such that two of said photons combine to a first energy value close to the energy value associated with a predetermined two-photon transition between said first excited state and one of said plurality of excited states; and such that the photons of one of said beams of photons are substantially equal in energy to the difference between said first energy value and a predetermined output energy, and
   means for directing said beams of photons through said conversion medium in such a manner that said beams of photons overlap spatially and temporally in said conversion medium and have a predetermined temporal relationship to said predetermined time, whereby said two beams of infrared radiation interact in said conversion medium to generate an output beam of infrared radiation.

2. An apparatus according to claim 1, in which said conversion medium is an atomic vapor, and in which said conversion vessel includes means for maintaining said medium in the vapor phase.

3. An apparatus according to claim 2, in which said means for exciting a portion of said atoms of said conversion medium to said first excited state includes means for generating input radiation of predetermined frequency, and in which said entrance window is transmitting at said predetermined frequency of said input radiation.

4. An apparatus according to claim 3, in which said atomic vapor is potassium.

5. An apparatus according to claim 3, in which said atomic vapor is rubidium.

* * * * *